(12) United States Patent
Hakola et al.

(10) Patent No.: US 12,526,033 B2
(45) Date of Patent: Jan. 13, 2026

(54) APPARATUS, METHOD, AND COMPUTER PROGRAM FOR DETERMINING A SERVING BEAM USING A MEASUREMENT REPORT POOL

(71) Applicant: Nokia Technologies Oy, Espoo (FI)

(72) Inventors: Sami Hakola, Kempele (FI); Timo Koskela, Oulu (FI); Mihai Enescu, Espoo (FI); Juha Karjalainen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 477 days.

(21) Appl. No.: 18/014,513

(22) PCT Filed: Jun. 14, 2021

(86) PCT No.: PCT/EP2021/065905
§ 371 (c)(1),
(2) Date: Jan. 5, 2023

(87) PCT Pub. No.: WO2022/008170
PCT Pub. Date: Jan. 13, 2022

(65) Prior Publication Data
US 2023/0261723 A1    Aug. 17, 2023

Related U.S. Application Data

(60) Provisional application No. 63/048,292, filed on Jul. 6, 2020.

(51) Int. Cl.
*H04B 7/06* (2006.01)
*H04B 7/08* (2006.01)

(52) U.S. Cl.
CPC ......... *H04B 7/06966* (2023.05); *H04B 7/088* (2013.01)

(58) Field of Classification Search
CPC ... H04B 7/06966; H04B 7/088; H04B 7/0695
See application file for complete search history.

(56) References Cited

U.S. PATENT DOCUMENTS

| 10,264,568 B2 | 4/2019 | Zhang et al. |
| 2017/0026938 A1 | 1/2017 | Onggosanusi et al. |
| | (Continued) | |

FOREIGN PATENT DOCUMENTS

| CN | 110226293 A | 9/2019 |
| WO | 2019/165239 A1 | 8/2019 |
| WO | 2019/193239 A1 | 10/2019 |

OTHER PUBLICATIONS

Ericsson, "On DL beam indication," 3GPP TSG-RAN WG1 #89ah-NR, R1-1711015, Qingdao, China, Jun. 27-30, 2017.

(Continued)

*Primary Examiner* — Justin T Van Roie
(74) *Attorney, Agent, or Firm* — Barta Jones, PLLC

(57) ABSTRACT

An apparatus including: at least one processor; and at least one memory including computer program code; the at least one memory and the computer program code configured to, with the at least one processor, cause the apparatus at least to: maintain a measurement report pool including a plurality of measurement reports provided to a base station, each measurement report indicating one or more downlink reference signals; receive information indicating a selected measurement report within the measurement report pool and indicating a selected downlink reference signal within the selected measurement report from a base station; and determine a serving beam based on the selected downlink reference signal within the selected measurement report.

5 Claims, 11 Drawing Sheets

(56) References Cited

U.S. PATENT DOCUMENTS

2019/0103908 A1    4/2019   Yu et al.
2020/0052765 A1    2/2020   Islam et al.

OTHER PUBLICATIONS

Samsung, "On BPL Update Procedure," 3GPP TSG RAN WG1 NR #90, R1-1714528, Prague, Czechia, Aug. 21-25, 2017.
Zte et al., "Details and evaluation results on beam indication," 3GPP TSG RAN WG1 Meeting NR#3, R1-1715445, Nagoya, Japan, Sep. 18-21, 2017.
"3rd Generation Partnership Project; Technical Specification Group Radio Access Network; NR; Physical layer procedures for data (Release 18)", 3GPP TS 38.214, V18.4.0, Sep. 2024, pp. 1-301.
"Enhancements on Multi-beam Operation", 3GPP TSG RAN WG1 #102-e, R1-2006843, Agenda: 8.1.1, Nokia, Aug. 17-28, 2020, 18 pages.
Office action received for corresponding Chinese Patent Application No. 202180048372.X, dated Feb. 26, 2025, 14 pages of Office Action and no page of translation available.
"New WID: Further enhancements on MIMO for NR", 3GPP TSG RAN Meeting #86, RP-193133, Agenda: 9.1.1, Samsung, Dec. 9-12, 2019, 5 pages.
Office action received for corresponding Japanese Patent Application No. 2023-501064, dated Jan. 22, 2024, 7 pages of office action and 2 pages of summary available.
Office action received for corresponding Japanese Patent Application No. 2023-501064, dated Jun. 6, 2024, 2 pages of office action and 7 pages of translation/summary available.
Office action received for corresponding European Patent Application No. 21733929.0, dated Jun. 18, 2025, 3 pages.

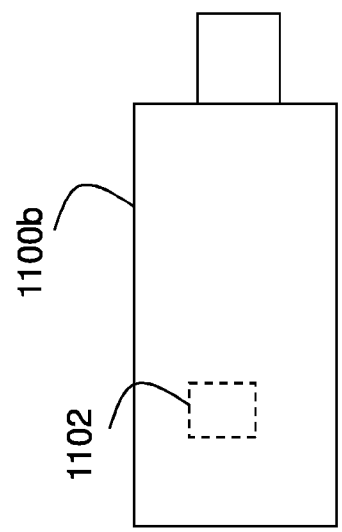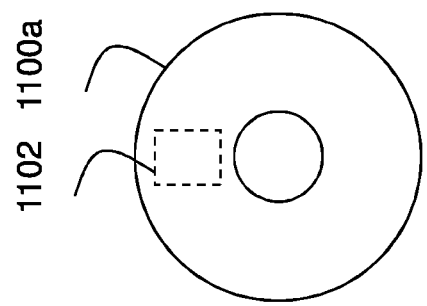
Fig. 11

APPARATUS, METHOD, AND COMPUTER PROGRAM FOR DETERMINING A SERVING BEAM USING A MEASUREMENT REPORT POOL

CROSS REFERENCE TO RELATED APPLICATION

This patent application is a U.S. National Stage application of International Patent Application Number PCT/EP2021/065905 filed Jun. 14, 2021, which claims priority to U.S. Provisional Application No. 63/048,292 filed Jul. 6, 2020, which are hereby incorporated by reference in their entireties.

FIELD OF THE DISCLOSURE

The present disclosure relates to an apparatus, a method, and a computer program for allowing a terminal to determine a serving beam based on a selected downlink reference signal within a selected measurement report in a cellular system.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet. In a wireless communication system at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is U IRAN (3G radio). Another example of an architecture that is known as the long-term evolution (LTE) or the Universal Mobile Telecommunications System (UMTS) radio-access technology. Another example communication system is so called 5G radio or new radio (NR) access technology.

SUMMARY

According to an aspect there is provided an apparatus comprising at least one processor and at least one memory including computer code for one or more programs, the at least one memory and the computer code configured, with the at least one processor, to cause the apparatus at least to: maintain a measurement report pool comprising a plurality of measurement reports provided to a base station, each measurement report indicating one or more downlink reference signals; receive information indicating a selected measurement report within the measurement report pool and indicating a selected downlink reference signal within the selected measurement report from a base station; and determine a serving beam based on the selected downlink reference signal within the selected measurement report.

The at least one memory and the computer program code may be configured to, with the at least one processor, cause the apparatus at least to: determine a downlink receive beam associated with the selected downlink reference signal; and determine the serving beam based on the downlink receive beam associated with the selected downlink reference signal.

The serving beam may be a serving downlink receive beam; and the at least one memory and the computer program code may be configured to, with the at least one processor, cause the apparatus at least to: use the serving downlink reception beam to receive one or more downlink signals or channels.

The serving beam may be a serving uplink transmit beam; and the at least one memory and the computer program code may be configured to, with the at least one processor, cause the apparatus at least to: use the serving uplink transmit beam to transmit one or more uplink signals or channels.

The at least one memory and the computer program code may be configured to, with the at least one processor, cause the apparatus at least to: receive an indication of the one or more uplink signals or channels and/or the one or more downlink signals or channels from the base station.

The at least one memory and the computer program code may be configured to, with the at least one processor, cause the apparatus at least to: use the serving downlink receive beam and/or the uplink transmit beam for a duration determined based on a serving downlink receive beam and/or the uplink transmit beam switching latency or activation latency of the apparatus.

Each measurement report may be indexed by an index of a first index space and each downlink reference signal is indexed by an index of a second index space.

The information may comprise the index of the selected measurement report and the index of the selected downlink reference signal measurement.

The at least one memory and the computer program code may be configured to, with the at least one processor, cause the apparatus at least to: receive a request to provide a measurement report from the base station, wherein the request comprises the index of the measurement report determined by the base station.

The at least one memory and the computer program code may be configured to, with the at least one processor, cause the apparatus at least to: provide a measurement report to the base station, wherein the measurement report comprises the index of the measurement report determined by the apparatus.

The measurement report pool may comprise a fixed number of measurement reports.

The measurement report pool may be operated according to a first in first out queue or sliding window.

The first index space may be common to measurement reports with any reporting periodicity type, measurement reports with any reporting resources, measurement reports with any reporting settings and/or measurement reports with any reported quantity.

The first index space may be specific to measurement reports with a specific reporting configuration type, measurement reports with a specific reporting resource, measurement reports with a specific reporting setting and/or measurement reports with a specific report quantity.

The reporting periodicity type may comprise aperiodic, semi-persistent report or periodic.

Each measurement report may indicate one or more strongest downlink reference signals.

Each measurement report may indicate two or more downlink reference signals received simultaneously.

According to an aspect there is provided an apparatus comprising means for: maintaining a measurement report pool comprising a plurality of measurement reports provided to a base station, each measurement report indicating one or more downlink reference signals; receiving information indicating a selected measurement report within the measurement report pool and indicating a selected downlink reference signal within the selected measurement report from a base station; and determining a serving beam based on the selected downlink reference signal within the selected measurement report.

The apparatus may comprise means for: determining a downlink receive beam associated with the selected downlink reference signal; and determining the serving beam based on the downlink receive beam associated with the selected downlink reference signal.

The serving beam may be a serving downlink receive beam; and the apparatus may comprise means for: using the serving downlink reception beam to receive one or more downlink signals or channels.

The serving beam may be a serving uplink transmit beam; and the apparatus may comprise means for: using the serving uplink transmit beam to transmit one or more uplink signals or channels.

The apparatus may comprise means for: receiving an indication of the one or more uplink signals or channels and/or the one or more downlink signals or channels from the base station.

The apparatus may comprise means for: using the serving downlink receive beam and/or the uplink transmit beam for a duration determined based on a serving downlink receive beam and/or the uplink transmit beam switching latency or activation latency of the apparatus.

Each measurement report may be indexed by an index of a first index space and each downlink reference signal is indexed by an index of a second index space.

The information may comprise the index of the selected measurement report and the index of the selected downlink reference signal measurement.

The apparatus may comprise means for: receiving a request to provide a measurement report from the base station, wherein the request comprises the index of the measurement report determined by the base station.

The apparatus may comprise means for: providing a measurement report to the base station, wherein the measurement report comprises the index of the measurement report determined by the apparatus.

The measurement report pool may comprise a fixed number of measurement reports.

The measurement report pool may be operated according to a first in first out queue or sliding window.

The first index space may be common to measurement reports with any reporting periodicity type, measurement reports with any reporting resources, measurement reports with any reporting settings and/or measurement reports with any reported quantity.

The first index space may be specific to measurement reports with a specific reporting configuration type, measurement reports with a specific reporting resource, measurement reports with a specific reporting setting and/or measurement reports with a specific report quantity.

The reporting periodicity type may comprise aperiodic, semi-persistent report or periodic.

Each measurement report may indicate one or more strongest downlink reference signals.

Each measurement report may indicate two or more downlink reference signals received simultaneously.

According to an aspect there is provided an apparatus comprising circuitry configured to: maintain a measurement report pool comprising a plurality of measurement reports provided to a base station, each measurement report indicating one or more downlink reference signals; receive information indicating a selected measurement report within the measurement report pool and indicating a selected downlink reference signal within the selected measurement report from a base station; and determine a serving beam based on the selected downlink reference signal within the selected measurement report.

The apparatus may comprise circuitry configured to: determine a downlink receive beam associated with the selected downlink reference signal; and determine the serving beam based on the downlink receive beam associated with the selected downlink reference signal.

The serving beam may be a serving downlink receive beam; and the apparatus may comprise circuitry configured to: use the serving downlink reception beam to receive one or more downlink signals or channels.

The serving beam may be a serving uplink transmit beam; and the apparatus may comprise circuitry configured to: use the serving uplink transmit beam to transmit one or more uplink signals or channels.

The apparatus may comprise circuitry configured to: receive an indication of the one or more uplink signals or channels and/or the one or more downlink signals or channels from the base station.

The apparatus may comprise circuitry configured to: use the serving downlink receive beam and/or the uplink transmit beam for a duration determined based on a serving downlink receive beam and/or the uplink transmit beam switching latency or activation latency of the apparatus.

Each measurement report may be indexed by an index of a first index space and each downlink reference signal is indexed by an index of a second index space.

The information may comprise the index of the selected measurement report and the index of the selected downlink reference signal measurement.

The apparatus may comprise circuitry configured to: receive a request to provide a measurement report from the base station, wherein the request comprises the index of the measurement report determined by the base station.

The apparatus may comprise circuitry configured to: provide a measurement report to the base station, wherein the measurement report comprises the index of the measurement report determined by the apparatus.

The measurement report pool may comprise a fixed number of measurement reports.

The measurement report pool may be operated according to a first in first out queue or sliding window.

The first index space may be common to measurement reports with any reporting periodicity type, measurement reports with any reporting resources, measurement reports with any reporting settings and/or measurement reports with any reported quantity.

The first index space may be specific to measurement reports with a specific reporting configuration type, measurement reports with a specific reporting resource, measurement reports with a specific reporting setting and/or measurement reports with a specific report quantity.

The reporting periodicity type may comprise aperiodic, semi-persistent report or periodic.

Each measurement report may indicate one or more strongest downlink reference signals.

Each measurement report may indicate two or more downlink reference signals received simultaneously.

According to an aspect there is provided a method comprising: maintaining a measurement report pool comprising a plurality of measurement reports provided to a base station, each measurement report indicating one or more downlink reference signals; receiving information indicating a selected measurement report within the measurement report pool and indicating a selected downlink reference signal within the selected measurement report from a base station; and determining a serving beam based on the selected downlink reference signal within the selected measurement report.

The method may comprise: determining a downlink receive beam associated with the selected downlink reference signal; and determining the serving beam based on the downlink receive beam associated with the selected downlink reference signal.

The serving beam may be a serving downlink receive beam; and the method may comprise: using the serving downlink reception beam to receive one or more downlink signals or channels.

The serving beam may be a serving uplink transmit beam; and the method may comprise: using the serving uplink transmit beam to transmit one or more uplink signals or channels.

The method may comprise: receiving an indication of the one or more uplink signals or channels and/or the one or more downlink signals or channels from the base station.

The method may comprise: using the serving downlink receive beam and/or the uplink transmit beam for a duration determined based on a serving downlink receive beam and/or the uplink transmit beam switching latency or activation latency of the apparatus.

Each measurement report may be indexed by an index of a first index space and each downlink reference signal is indexed by an index of a second index space.

The information may comprise the index of the selected measurement report and the index of the selected downlink reference signal measurement.

The method may comprise: receiving a request to provide a measurement report from the base station, wherein the request comprises the index of the measurement report determined by the base station.

The method may comprise: providing a measurement report to the base station, wherein the measurement report comprises the index of the measurement report determined by the apparatus.

The measurement report pool may comprise a fixed number of measurement reports.

The measurement report pool may be operated according to a first in first out queue or sliding window.

The first index space may be common to measurement reports with any reporting periodicity type, measurement reports with any reporting resources, measurement reports with any reporting settings and/or measurement reports with any reported quantity.

The first index space may be specific to measurement reports with a specific reporting configuration type, measurement reports with a specific reporting resource, measurement reports with a specific reporting setting and/or measurement reports with a specific report quantity.

The reporting periodicity type may comprise aperiodic, semi-persistent report or periodic.

Each measurement report may indicate one or more strongest downlink reference signals.

Each measurement report may indicate two or more downlink reference signals received simultaneously.

According to an aspect there is provided a computer program comprising computer executable code which when run on at least one processor is configured to: maintain a measurement report pool comprising a plurality of measurement reports provided to a base station, each measurement report indicating one or more downlink reference signals; receive information indicating a selected measurement report within the measurement report pool and indicating a selected downlink reference signal within the selected measurement report from a base station; and determine a serving beam based on the selected downlink reference signal within the selected measurement report.

The computer program may comprise computer executable code which when run on at least one processor is configured to: determine a downlink receive beam associated with the selected downlink reference signal; and determine the serving beam based on the downlink receive beam associated with the selected downlink reference signal.

The serving beam may be a serving downlink receive beam; and the computer program may comprise computer executable code which when run on at least one processor is configured to: use the serving downlink reception beam to receive one or more downlink signals or channels.

The serving beam may be a serving uplink transmit beam; and the computer program may comprise computer executable code which when run on at least one processor is configured to: use the serving uplink transmit beam to transmit one or more uplink signals or channels.

The computer program may comprise computer executable code which when run on at least one processor is configured to: receive an indication of the one or more uplink signals or channels and/or the one or more downlink signals or channels from the base station.

The computer program may comprise computer executable code which when run on at least one processor is configured to: use the serving downlink receive beam and/or the uplink transmit beam for a duration determined based on a serving downlink receive beam and/or the uplink transmit beam switching latency or activation latency of the apparatus.

Each measurement report may be indexed by an index of a first index space and each downlink reference signal is indexed by an index of a second index space.

The information may comprise the index of the selected measurement report and the index of the selected downlink reference signal measurement.

The computer program may comprise computer executable code which when run on at least one processor is configured to: receive a request to provide a measurement report from the base station, wherein the request comprises the index of the measurement report determined by the base station.

The computer program may comprise computer executable code which when run on at least one processor is configured to: provide a measurement report to the base station, wherein the measurement report comprises the index of the measurement report determined by the apparatus.

The measurement report pool may comprise a fixed number of measurement reports.

The measurement report pool may be operated according to a first in first out queue or sliding window.

The first index space may be common to measurement reports with any reporting periodicity type, measurement reports with any reporting resources, measurement reports with any reporting settings and/or measurement reports with any reported quantity.

The first index space may be specific to measurement reports with a specific reporting configuration type, measurement reports with a specific reporting resource, measurement reports with a specific reporting setting and/or measurement reports with a specific report quantity.

The reporting periodicity type may comprise aperiodic, semi-persistent report or periodic.

Each measurement report may indicate one or more strongest downlink reference signals.

Each measurement report may indicate two or more downlink reference signals received simultaneously.

According to an aspect there is provided an apparatus comprising at least one processor and at least one memory including computer code for one or more programs, the at least one memory and the computer code configured, with the at least one processor, to cause the apparatus at least to: maintain a measurement report pool comprising a plurality of measurement reports received from a terminal, each measurement report indicating one or more downlink reference signals; and provide information indicating a selected measurement report within the measurement report pool and indicating a selected downlink reference signal within the selected measurement report to the terminal.

The at least one memory and the computer program code may be configured to, with the at least one processor, cause the apparatus at least to: provide an indication of one or more uplink signals or channels and/or one or more downlink signals or channels to the terminal.

Each measurement report may be indexed by an first index in a first index space and each downlink reference signal measurement is indexed by an index in a second index space.

The information may indicate the index of the selected measurement report and the index of the selected downlink reference signal.

The at least one memory and the computer program code may be configured to, with the at least one processor, cause the apparatus at least to: provide a request to provide a measurement report from the base station, wherein the request comprises the index of the measurement report determined to the terminal.

The at least one memory and the computer program code may be configured to, with the at least one processor, cause the apparatus at least to: receive a measurement report from a terminal, wherein the measurement report comprises the index of the measurement report determined by the terminal.

The measurement report pool may comprise a fixed number of measurement reports.

The measurement reports may be updated following a first in first out rule.

The first index space may be common to measurement reports with any reporting periodicity type, measurement reports with any reporting resources, measurement reports with any reporting settings and/or measurement reports with any reported quantity.

The first index space may be specific to measurement reports with a specific reporting configuration type, measurement reports with a specific reporting resource, measurement reports with a specific reporting setting and/or measurement reports with a specific report quantity.

The reporting periodicity type may comprise aperiodic, semi-persistent report or periodic.

Each measurement report may indicate one or more strongest downlink reference signals.

Each measurement report may indicate two or more downlink reference signals received simultaneously.

According to an aspect there is provided an apparatus comprising means for: maintaining a measurement report pool comprising a plurality of measurement reports received from a terminal, each measurement report indicating one or more downlink reference signals; and providing information indicating a selected measurement report within the measurement report pool and indicating a selected downlink reference signal within the selected measurement report to the terminal.

The apparatus may comprise means for: providing an indication of one or more uplink signals or channels and/or one or more downlink signals or channels to the terminal.

Each measurement report may be indexed by an first index in a first index space and each downlink reference signal measurement is indexed by an index in a second index space.

The information may indicate the index of the selected measurement report and the index of the selected downlink reference signal.

The apparatus may comprise means for: providing a request to provide a measurement report from the base station, wherein the request comprises the index of the measurement report determined to the terminal.

The apparatus may comprise means for: receive a measurement report from a terminal, wherein the measurement report comprises the index of the measurement report determined by the terminal.

The measurement report pool may comprise a fixed number of measurement reports.

The measurement reports may be updated following a first in first out rule.

The first index space may be common to measurement reports with any reporting periodicity type, measurement reports with any reporting resources, measurement reports with any reporting settings and/or measurement reports with any reported quantity.

The first index space may be specific to measurement reports with a specific reporting configuration type, measurement reports with a specific reporting resource, measurement reports with a specific reporting setting and/or measurement reports with a specific report quantity.

The reporting periodicity type may comprise aperiodic, semi-persistent report or periodic.

Each measurement report may indicate one or more strongest downlink reference signals.

Each measurement report may indicate two or more downlink reference signals received simultaneously.

According to an aspect there is provided an apparatus comprising circuitry configured to: maintain a measurement report pool comprising a plurality of measurement reports received from a terminal, each measurement report indicating one or more downlink reference signals; and provide information indicating a selected measurement report within the measurement report pool and indicating a selected downlink reference signal within the selected measurement report to the terminal.

The apparatus may comprise circuitry configured to: provide an indication of one or more uplink signals or channels and/or one or more downlink signals or channels to the terminal.

Each measurement report may be indexed by an first index in a first index space and each downlink reference signal measurement is indexed by an index in a second index space.

The information may indicate the index of the selected measurement report and the index of the selected downlink reference signal.

The apparatus may comprise circuitry configured to: provide a request to provide a measurement report from the base station, wherein the request comprises the index of the measurement report determined to the terminal.

The apparatus may comprise circuitry configured to: receive a measurement report from a terminal, wherein the measurement report comprises the index of the measurement report determined by the terminal.

The measurement report pool may comprise a fixed number of measurement reports.

The measurement reports may be updated following a first in first out rule.

The first index space may be common to measurement reports with any reporting periodicity type, measurement reports with any reporting resources, measurement reports with any reporting settings and/or measurement reports with any reported quantity.

The first index space may be specific to measurement reports with a specific reporting configuration type, measurement reports with a specific reporting resource, measurement reports with a specific reporting setting and/or measurement reports with a specific report quantity.

The reporting periodicity type may comprise aperiodic, semi-persistent report or periodic.

Each measurement report may indicate one or more strongest downlink reference signals.

Each measurement report may indicate two or more downlink reference signals received simultaneously.

According to an aspect there is provided a method comprising: maintaining a measurement report pool comprising a plurality of measurement reports received from a terminal, each measurement report indicating one or more downlink reference signals; and providing information indicating a selected measurement report within the measurement report pool and indicating a selected downlink reference signal within the selected measurement report to the terminal.

The method may comprise: providing an indication of one or more uplink signals or channels and/or one or more downlink signals or channels to the terminal.

Each measurement report may be indexed by an first index in a first index space and each downlink reference signal measurement is indexed by an index in a second index space.

The information may indicate the index of the selected measurement report and the index of the selected downlink reference signal.

The method may comprise: providing a request to provide a measurement report from the base station, wherein the request comprises the index of the measurement report determined to the terminal.

The method may comprise: receive a measurement report from a terminal, wherein the measurement report comprises the index of the measurement report determined by the terminal.

The measurement report pool may comprise a fixed number of measurement reports.

The measurement reports may be updated following a first in first out rule.

The first index space may be common to measurement reports with any reporting periodicity type, measurement reports with any reporting resources, measurement reports with any reporting settings and/or measurement reports with any reported quantity.

The first index space may be specific to measurement reports with a specific reporting configuration type, measurement reports with a specific reporting resource, measurement reports with a specific reporting setting and/or measurement reports with a specific report quantity.

The reporting periodicity type may comprise aperiodic, semi-persistent report or periodic.

Each measurement report may indicate one or more strongest downlink reference signals.

Each measurement report may indicate two or more downlink reference signals received simultaneously.

According to an aspect there is provided a computer program comprising computer executable code which when run on at least one processor is configured to: maintain a measurement report pool comprising a plurality of measurement reports received from a terminal, each measurement report indicating one or more downlink reference signals; and provide information indicating a selected measurement report within the measurement report pool and indicating a selected downlink reference signal within the selected measurement report to the terminal.

The computer program may comprise computer executable code which when run on at least one processor is configured to: provide an indication of one or more uplink signals or channels and/or one or more downlink signals or channels to the terminal.

Each measurement report may be indexed by an first index in a first index space and each downlink reference signal measurement is indexed by an index in a second index space.

The information may indicate the index of the selected measurement report and the index of the selected downlink reference signal.

The computer program may comprise computer executable code which when run on at least one processor is configured to: provide a request to provide a measurement report from the base station, wherein the request comprises the index of the measurement report determined to the terminal.

The computer program may comprise computer executable code which when run on at least one processor is configured to: receive a measurement report from a terminal, wherein the measurement report comprises the index of the measurement report determined by the terminal.

The measurement report pool may comprise a fixed number of measurement reports.

The measurement reports may be updated following a first in first out rule.

The first index space may be common to measurement reports with any reporting periodicity type, measurement reports with any reporting resources, measurement reports with any reporting settings and/or measurement reports with any reported quantity.

The first index space may be specific to measurement reports with a specific reporting configuration type, measurement reports with a specific reporting resource, measurement reports with a specific reporting setting and/or measurement reports with a specific report quantity.

The reporting periodicity type may comprise aperiodic, semi-persistent report or periodic.

Each measurement report may indicate one or more strongest downlink reference signals.

Each measurement report may indicate two or more downlink reference signals received simultaneously.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

List of Abbreviations

ACK: Acknowledgement
AF: Application Function
AMF: Access Management Function
AUSF: Authentication Server Function
BS: Base Station
CU: Centralized Unit
CSI-RS: Channel State Information Reference Signal
DCI: Downlink Control Information
DL: Downlink
DN: Data Network
DU: Distributed Unit
eNB: eNodeB
FeMIMO: Further enhanced Multiple Input Multiple Output
FIFO: First In First Out
FR: Frequency Range
gNB: gNodeB
GSM: Global System for Mobile communication
HARQ: Hybrid Automatic Repeat Request
HSS: Home Subscriber Server
IMS: IP multimedia subsystem
IoT: Internet of Things
IP: Internet Protocol
LTE: Long Term Evolution
MAC: Medium Access Control
MPR: Maximum Power Reduction
MS: Mobile Station
MTC: Machine Type Communication
NEF: Network Exposure Function
NF: Network Function
NR: New radio
NZP: Non-Zero Power
PCC: Policy and Charging Control
PDCCH: Physical Downlink Control Channel
PDSCH: Physical Downlink Shared Channel
PDU: Packet Data Unit
PSA: PDU session anchor
PUCCH: Physical Uplink Control Channel
PUSCH: Physical Uplink Shared Channel
QCL: Quasi-CoLocation
RAM: Random Access Memory
(R)AN: (Radio) Access Network
ROM: Read Only Memory
RS: Reference Signal
RX: Receive
SDM: Spatial Domain Multiplexing
SMF: Session Management Function
SRS: Sounding Reference Signal
SSB: Synchronisation Signals Block
TCI: Transmission Configuration Indication
TDD: Time Division Duplex
TRP: TRansmission Point
TX: Transmit
UCI: Uplink Control information
UE: User Equipment
UL: Uplink
UP: User Plane
UMTS: Universal Mobile Telecommunication System
URLLC: Ultra-Reliable Low Latency Communication
USB: Universal Serial Bus
WID: Word Item Description
3GPP: 3th Generation Partnership Project
5G: 5th Generation
5GC: 5G Core network
5GS: 5G System

BRIEF DESCRIPTION OF THE FIGURES

Embodiments will now be described, by way of example only, with reference to the accompanying Figures in which:

FIG. 11 shows a schematic representation of a non-volatile memory medium storing instructions which when executed by a processor allow a processor to perform one or more of the steps of the method of FIGS. 9 and 10.

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
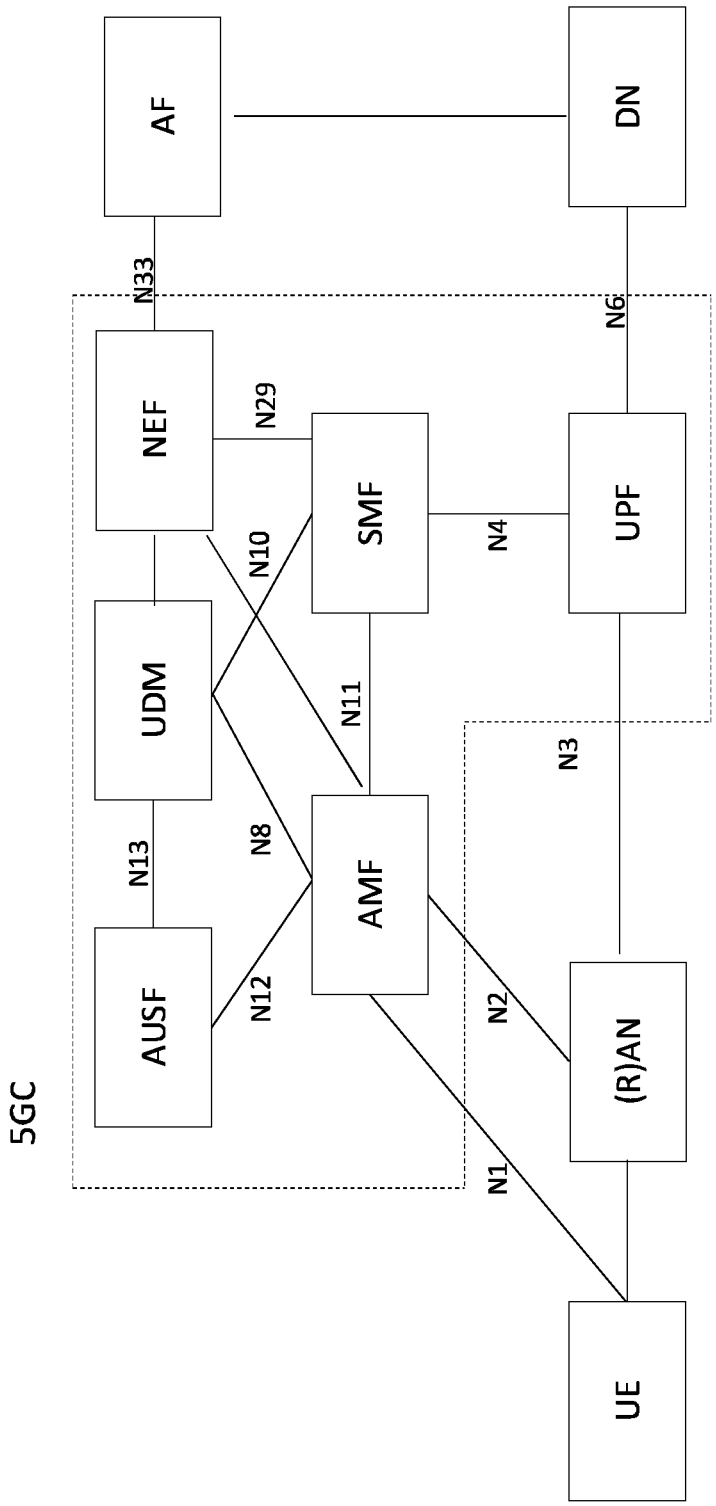
FIG. 1 shows a schematic representation of a 5G system.

FIG. 1 shows a schematic representation of a 5G system (5GS). The 5GS may comprises a terminal, a (radio) access network ((R)AN), a 5G core network (5GC), one or more application functions (AF) and one or more data networks (DN).

The 5G (R)AN may comprise one or more gNodeB (gNB) distributed unit functions connected to one or more gNodeB (gNB) centralized unit functions.

The 5GC may comprise an access management function (AMF), a session management function (SMF), an authentication server function (AUSF), a user data management (UDM), a user plane function (UPF) and/or a network exposure function (NEF).

Figure 2:
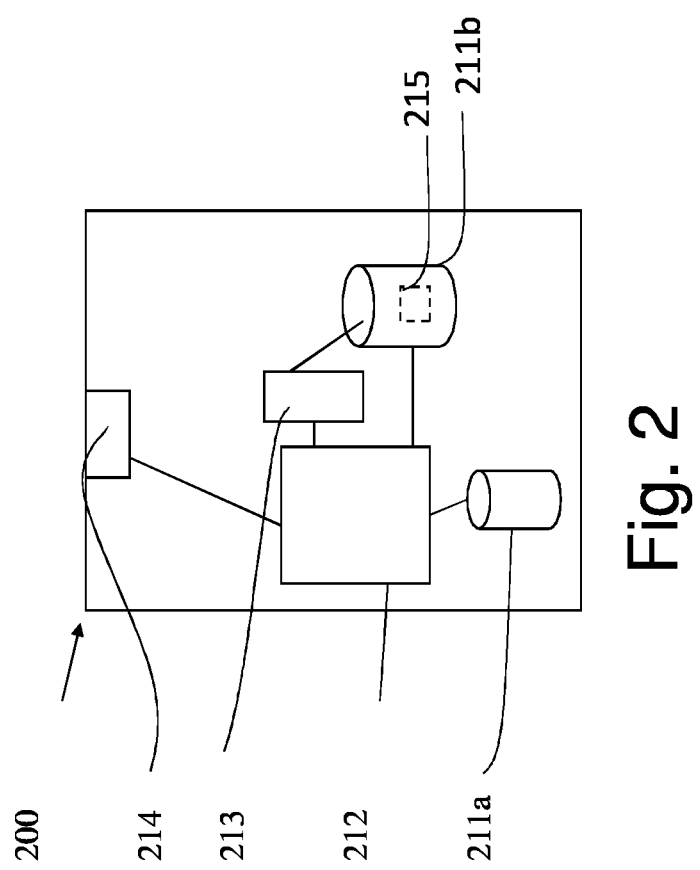
FIG. 2 shows a schematic representation of a control apparatus.

FIG. 2 illustrates an example of a control apparatus 200 for controlling a function of the (R)AN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5G (R)AN or the 5GC. In some embodiments, each function of the (R)AN or the 5GC comprises a control apparatus 200. In alternative embodiments, two or more functions of the (R)AN or the 5GC may share a control apparatus.

Figure 3:
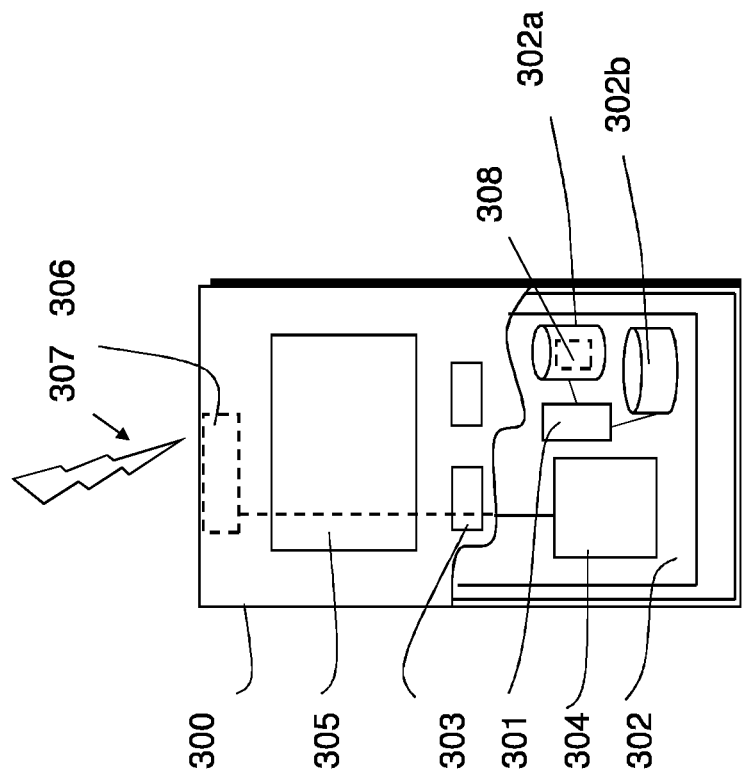
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302a and the ROM 211b. The at least one processor 301 may be configured to execute an appropriate software code 308. The software code 308 may for example allow to perform one or more of the present aspects. The software code 308 may be stored in the ROM 302b.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

One or more aspect of this disclosure relate to 3GPP NR physical layer development.

One or more aspects of this disclosure relate to a new beam indication mechanism that may be implemented with lower configuration, update and/or signalling overhead. The new beam indication mechanism may provide better support, for example in high mobility use cases.

In 3GPP Release 17 further enhanced multiple input multiple output (FeMIMO) work item description (WID) the following objective is stated [RP-1931339]:

"1. Enhancement on multi-beam operation, mainly targeting FR2 while also applicable to FR1:
   a. Identify and specify features to facilitate more efficient (lower latency and overhead) DL/UL beam management to support higher intra- and L1/L2-centric inter-cell mobility and/or a larger number of configured TCI states:
      i. Common beam for data and control transmission/reception for DL and UL, especially for intra-band CA
      ii. Unified TCI framework for DL and UL beam indication
      iii. Enhancement on signaling mechanisms for the above features to improve latency and efficiency with more usage of dynamic control signaling (as opposed to RRC)"

Due to technology limitations and increasing coupling loss as function of carrier frequency, system operation especially in frequency range FR2 (i.e. 24 and 52.6 GHz) and above 52.6 GHz may need to utilize narrow downlink (DL) transmit (TX) beams and uplink (UL) receive (RX) beams at a gNB and narrow UL transmit TX beams and (DL RX beams at a UE. At the gNB the narrow DL TX beams and UL RX beams may be narrower than conventional sector wide beams. At the UE the narrow UL TX beams and DL RX beams may be narrower than conventional omnidirectional beams.

Beam based connections in FR2 and above 52.6 GHz may be sensitive to blocking effect. As a result, a procedure to handle beam failure has been specified to replace beam pair links (i.e. DL TX beam/DL RX beam and/or UL TX beam/UL RX beam) between a gNB and a UE with an alternative beam pair link.

However, the procedure to handle beam failure may be slow, for example due to long measurement averaging (e.g. 5 samples per failure detection) based on periodic DL signals with low periodicity (e.g. 20, 40 or 80 ms).

Mobility/High mobility in a beam based system may introduce additional challenge. A beam switching procedure should be fast enough to replace a beam pair link (i.e. DL TX beam/DL RX beam and/or UL TX beam/UL RX beam) between the gNB and the UE with an alternative beam pair link.

In existing NR systems a beam switch procedure may conventionally comprise the following steps.

In step 1 the gNB may configure the UE with candidate DL reference signals (RS), such as synchronisation signal block (SSB) and/or channel state indication reference signal (CSI-RS). Each candidate DL RS may be associated with a DL beam pair link (i.e. DL TX beam and a DL RX).

In step 2, the UE may measure each candidate DL RS. The UE may determine the strength of each candidate DL RS.

In step 3, the UE may provide a measurement report to the gNB indicating the strongest candidate DL RSs.

In step 4, the gNB may update transmission configuration indicator (TCI) states in DL for the UE based on the measurement report. The gNB may update spatial relations in UL for the UE based on the measurement report. The updating of the TCI states in DL may be performed per DL signal or channel. The updating of the spatial relations in UL may be performed per UL signal or channel.

For DL signal or channel, quasi-colocation (QCL) characteristics have been defined. The UE may be configured with or may implicitly determine one or more source DL RSs that UE has received and measured earlier which defines how to set DL RX beam to receive subsequent target DL physical signal or channel. To provide the UE with the QCL characteristics, TCI states have been further defined. UE may be configured with TCI states to provide UE with one or more source DL RSs for determining QCL characteristics. Each TCI state may include one or two source RSs that provide the UE with QCL TypeA, TypeB, TypeC and/or TypeD parameters.

Different types provide the parameters as follows:
QCL-TypeA: {Doppler shift, Doppler spread, average delay, delay spread}
QCL-TypeB: {Doppler shift, Doppler spread}
QCL-TypeC: {Doppler shift, average delay}
QCL-TypeD: {Spatial Rx parameter}

For UL signal or channel, the UE may be provided with a parameter called spatial relation providing a spatial source RS based on which the UE may determine the UL TX beam for subsequent target UL physical signal and channel. The spatial source RS can be a DL RS (SSB or CSI-RS) or a UL RS (SRS).

For each PUCCH and SRS resource, the gNB may provide the spatial source RS explicitly (i.e. directly). For PUSCH the gNB may provide the spatial source RS implicitly (i.e. indirectly) as follows:

PUSCH scheduled using DCI format 0_0, spatial source RS may be the same as with a certain PUCCH resource.

PUSCH scheduled using DCI format 0_1, spatial source RS may be the same as indicated SRS resource(s):
One SRS resource indicated in codebook based transmission scheme; or
One or multiple SRS resources indicated in non-codebook based transmission scheme.

Beam indication in DL may be based on providing UE with QCL-TypeD source RS using a TCI state. TypeD QCL may indicate that a UE can use the same spatial RX assumption for reception of the RX as for the given source RS. For UL transmission the UE may be explicitly provided with a spatial relation information. The spatial relation information may include a spatial source RS based on which the UE may generate the UL beam.

A problem with the above beam switching procedure is the large number of steps. For a UE in a high mobility state, these steps may cause high processing and signalling load, in particular for a serving gNB. It would therefore be desirable to provide a new beam switching procedure that would lead to lower processing and signalling load for the serving gNB.

Another problem may relate to UL coverage. A conventional bottleneck of time division duplex (TDD) systems is UL coverage. Beam based connections in FR2 and above 52.6 GHz may be sensitive to blocking effect and may further challenge the UL coverage. A beam failure recovery procedure may be slow and may not consider UL TX beam/UL RX beam quality. A beam failure recovery may only consider DL TX beam/DL RX beam quality. It would therefore be desirable to improve UL coverage (e.g. improve robustness), in particular for critical uplink control information (UCI) transmissions.

One way of improving robustness of UL coverage is to utilize beam diversity in UL transmissions. UL transmission may exploit multiple beam pair links (i.e. UL TX beam/UL RX) between the UE and the gNB. Multiplexing among multiple beam pair links may be provided using time domain, frequency domain and/or spatial domain.

In FR2 and above 52.6 GHz additional challenge may arise in finding and determining an UL TX transmit beam at the UE and UL receive beam at the gNB.

In existing NR systems the UL TX transmit beam at the UE may be determined based on a single DL RS. The single DL RS may be found based on DL RSs configured by the gNB and measurement report from the UE. For example, the UE may provide a measurement report to the gNB indicating one or more strongest DL RSs (e.g. up to four strongest DL RSs) and the gNB may configure one of the one or more strongest DL RSs as spatial source for the UE to determine the UL TX transmit beam. That is, the UE may use the DL RX beam used to receive DL RS as UL TX beam.

Another alternative is to configure the UE with sounding reference signals (SRS). Each SRS may be associated with an SRS resource and UL TX beam. Based on received signal power measurements on the SRSs the gNB may select and indicate an SRS resource. The UE may then determine the UL TX beam associated with the SRS resource. However, SRS based UL TX beam determination may causes significant overhead and latency into overall system should be avoided.

Figure 4:
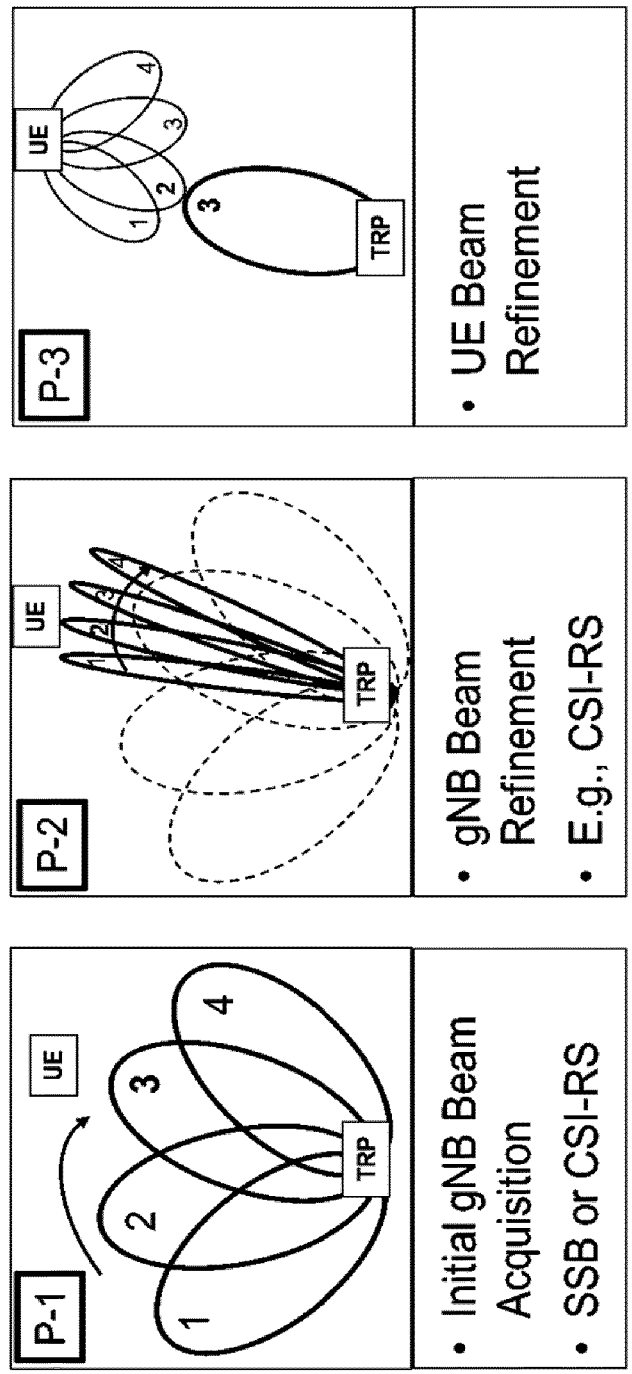
FIG. 4 shows a schematic representation of a procedure for performing beam acquisition, measuring and reporting.

FIG. 4 shows a schematic representation of a procedure for performing beam acquisition, measuring and reporting. The procedure may be split into sub-procedures P-1, P-2 and P-3.

In P-1, initial candidate DL RSs may be configured at the UE by the gNB. The initial candidate DL RSs may be assessed. Each initial candidate DL RS may be associated with a DL TX beam and a DL RX beam.

A transmission point (TRP), such as a gNB, may perform beam sweeping. The beam sweeping may be an intra TRP beam sweeping or an inter TRP beam sweeping. The UE may perform beam sweeping as well. In this way the UE may measure each initial candidate DL RS and may report a strongest initial candidate DL RS to the gNB.

In P-2, refined candidate DL RSs may be determined by the gNB based on the strongest initial candidate DL RS. The refined candidate DL RSs may be configured at the UE. The refined candidate DL RSs may be assessed. Each refined candidate DL RS may be associated with a DL TX beam and a DL RX beam.

The DL TX beam of the refined candidate DL RSs may be different from the DL TX of the strongest initial candidate DL RS (i.e. narrower than the DL TX of the strongest initial candidate DL RS). The DL RX beam of the refined candidate DL RSs may be the same as the DL RX of the strongest initial candidate DL RS.

The TRP may perform beam sweeping. The beam sweeping may be an intra TRP beam sweeping or an inter TRP beam sweeping. In this way the UE may measure each refined candidate DL RS and may report the strongest refined candidate DL RS to the gNB.

In P-3, further refined candidate DL RSs may be determined by the UE based on the strongest refined candidate DL RS. The further refined candidate DL RSs may be assessed. Each further refined candidate DL RS may be associated with a DL TX beam and a DL RX beam.

The DL TX beam of the further refined candidate DL RSs may be the same as the DL TX of the strongest refined candidate DL RS. The DL RX beam of the further refined candidate DL RSs may be different from the DL RX of the strongest refined candidate DL RS (i.e. narrower than the DL RX of the strongest refined candidate DL RS).

The UE may perform beam sweeping. In this way the UE may measure each further refined candidate DL RS and may report the strongest further refined candidate DL RS to the gNB.

In 3GPP Release 15 and Release 16 the UE may be configured to report a group of DL RSs that the UE may receive simultaneously using single or multiple spatial filters. The gNB may not be aware whether UE has used single or multiple panels for the measurement. The gNB may not be aware of the UE's UL transmission capability regarding the reported DL RSs (i.e. whether the UE can generate a UL TX beam based on reported group of DL RSs).

Figure 5:
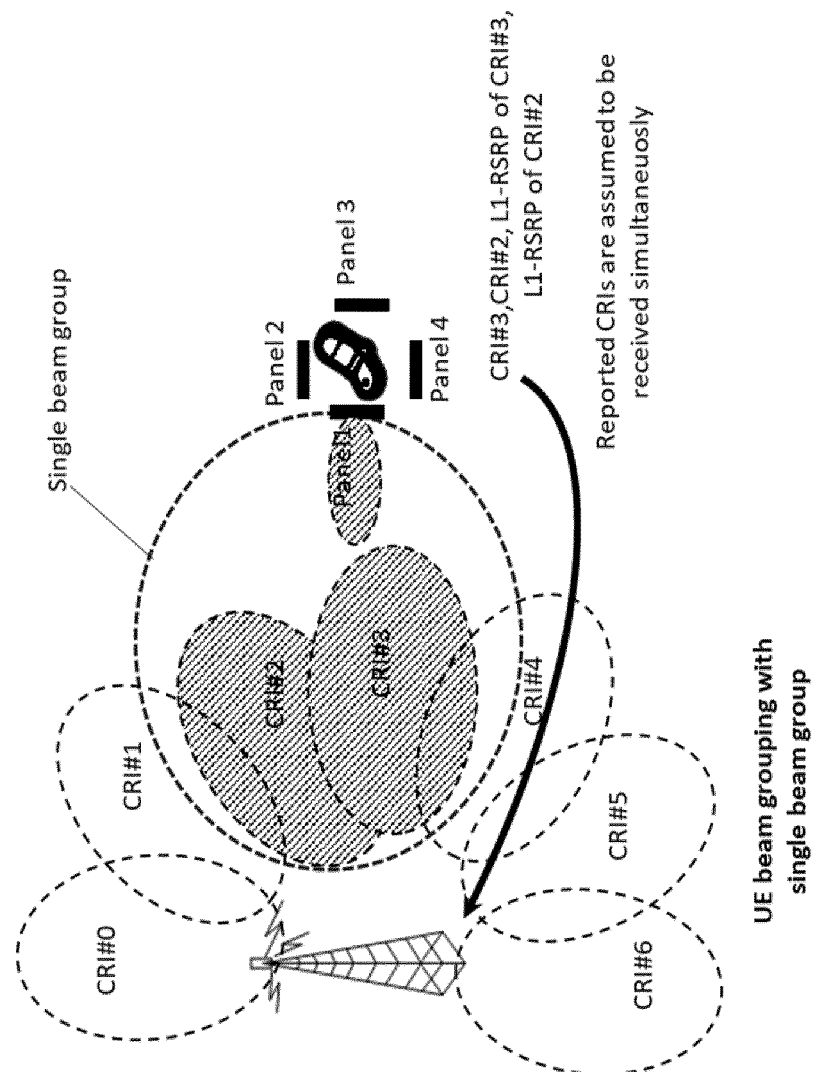
FIG. 5 shows a schematic representation of a beam group measurement report with non-zero power channel state information reference signals and a single UE beam group.

FIG. 5 shows an example of beam group measurement report with non-zero power channel state information reference signals (NZP-CSI-RS) and a single UE beam group. When only a single beam group is configured, the UE may be assumed to receive simultaneously up to four CSI-RS resource indicators (CRI). Here, for simplicity, only two CRIs are shown. Since multiple CRIs can be received with a single UE beam group, no extra time may need to be reserved when a TX beam change occurs within the beam group. As a result of this, the scheduling restrictions of a network may be reduced.

One or more aspects of this disclosure provide a beam indication/beam switching mechanism wherein the UE is provided with an index indicating a previously transmitted measurement report and an index indicating a DL RS in the previously transmitted measurement beam report. The DL RS in the previously transmitted measurement beam report may be used to determine a serving beam to be use for some or all of DL and UL signals and/or channels.

For DL signals and/or channels the UE may use the DL RX beam used to receive the DL RS to receive the DL signals and/or channels.

For UL signals and/or channels the UE may use the DL RX beam used to receive the DL RS as UL TX beam to transmit the UL signals and/or channels.

One or more aspects of this disclosure relate to configuring at the gNB and/or at the UE a measurement report pool. The measurement report pool may comprise N x K-elements. N may refer to the number of measurement reports in the measurement report pool or the length of the measurement report pool in time (e.g. n=0 refers to the oldest measurement report whereas n=N may refer to the newest measurement report). K may refer to the number of element per measurement.

The element with index 0 to k−1 of each measurement report may comprise DL RSs. The DL RSs may be a CSI-RS, NZP-CSI-RS and/or SSB.

The element with index k of each measurement report may comprise a measurement report chain or beam report chain. The measurement report chain may provide a link between a measurement configuration index and a DL-RS resource index (e.g. measConfig(Id)→CSIReportConfig(Id) →CSIResourceConfig(Id)→resourcesForChannelMeasurement→NZP-nzp-CSI-RS-ResourceSet→CSI-RS-ResourceId). The gNB may determine the measurement report chain. The gNb may explicitly indicate the measurement report chain to the UE or the UE may implicitly determine the measurement report chain according to a set of rule. The UE may maintain the measurement report chain.

As explained above, each measurement report may be indexed within the measurement report pool (e.g. n=0 . . . n=N). The indexing may be common across different measurement and reporting configurations (each configuration may have own periodicity type and other parameter) or the indexing may be per measurement and reporting configuration.

The index may be provided by the gNB when requesting the measurement report (e.g. aperiodic reporting request) or the index may be determined implicitly by the UE when providing the report. For example, the measurement report pool may have a fixed number of measurement reports (e.g. 4). The measurement report pool may be operated according to a first-in-first-out (FIFO) queue or sliding window. The newest measurement report may be at the top of the measurement report pool. The oldest measurement report may be at the bottom of the measurement report pool. The oldest measurement report may be removed from the measurement report and the latest measurement report may be added to the measurement report. In this way, UEs with high velocities/mobilities may be prevented from using a DL-RS within an out of date measurement report to determine the serving beam.

Figure 6:
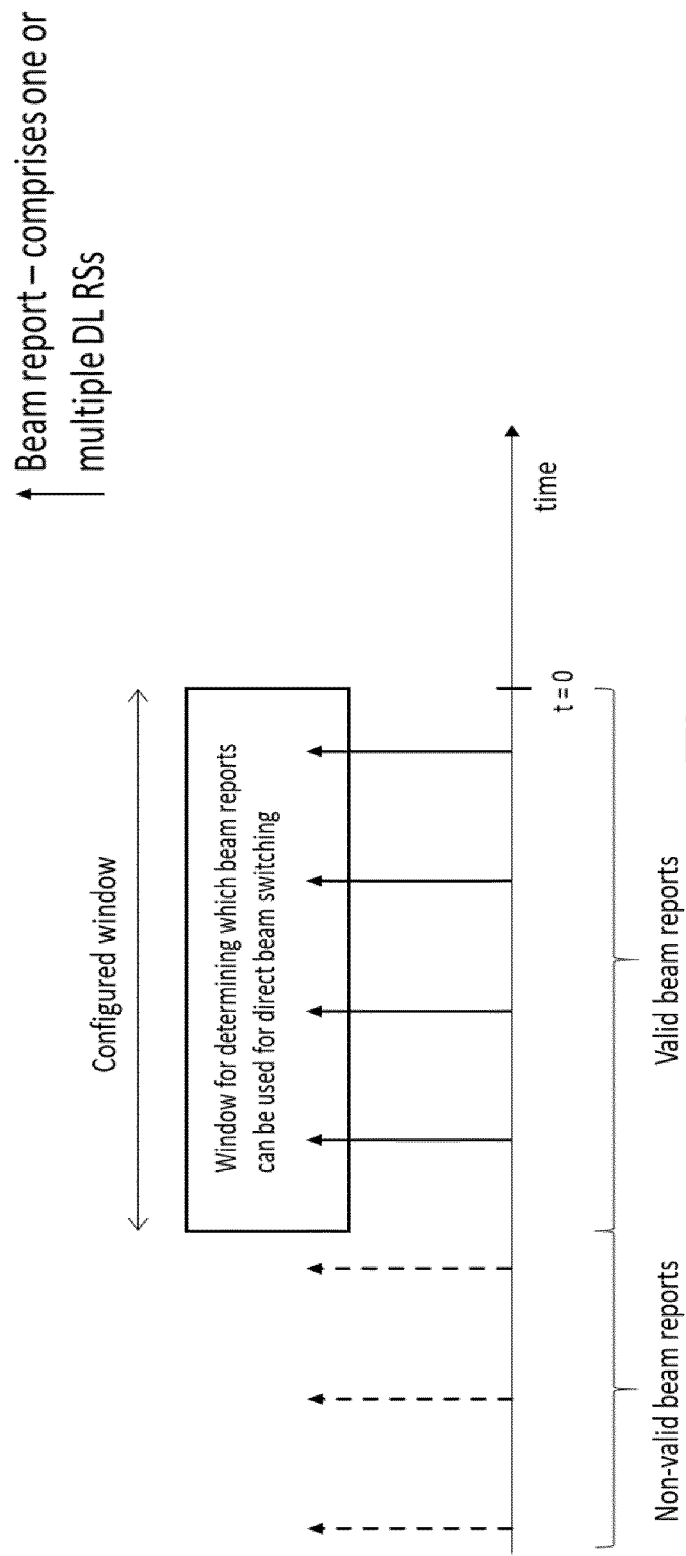
FIG. 6 shows a schematic representation of a measurement report pool operated according to a first in first out queue or sliding window.

FIG. 6 shows a schematic representation of a measurement report pool operated according to a FIFO queue or sliding window.

The gNB may provide an index of a measurement report within the pool and an index of a DL-RS within the measurement report to the UE. The UE may use the DL-RS as a spatial source to determine the serving beam.

The serving beam may be used for all DL and UL signals and channels or a subset of DL and UL signals and channels.

For DL signals and/or channels the UE may use the DL RX beam used to receive the DL RS to receive the DL signals and/or channels.

For UL signals and/or channels the UE may use the DL RX beam used to receive the DL RS as UL TX beam to transmit the UL signals and/or channels.

The DL and UL signals and channels may comprise PDCCH, CSI-RS for CSI, PDSCH, PUCCH, PUSCH, SRS for UL CSI.

The gNB may configure to the UE with all DL and UL signals and channels or a subset of DL and UL signals and channels, for example using higher layer configuration.

The serving beam may be used for a time period. The time period may be determined based on a switching and/or activation latency at the UE (e.g. serving beam switching latency, serving beam activation latency, panel switching latency, panel activation latency or other).

The index of a measurement report within the measurement report pool and the index of a DL-RS within the measurement report may be signalled to the UE using a certain DCI format. The UE may transmit an acknowledgement, such as a hybrid automatic repeat request acknowledgement (HARQ ACK) to the gNB upon receiving the index of a measurement report within the pool and the index of a DL-RS within the measurement report to ensure reliability. The HARQ ACK may be transmitted on resources provided in the DCI (Downlink Control Information).

Figure 7:
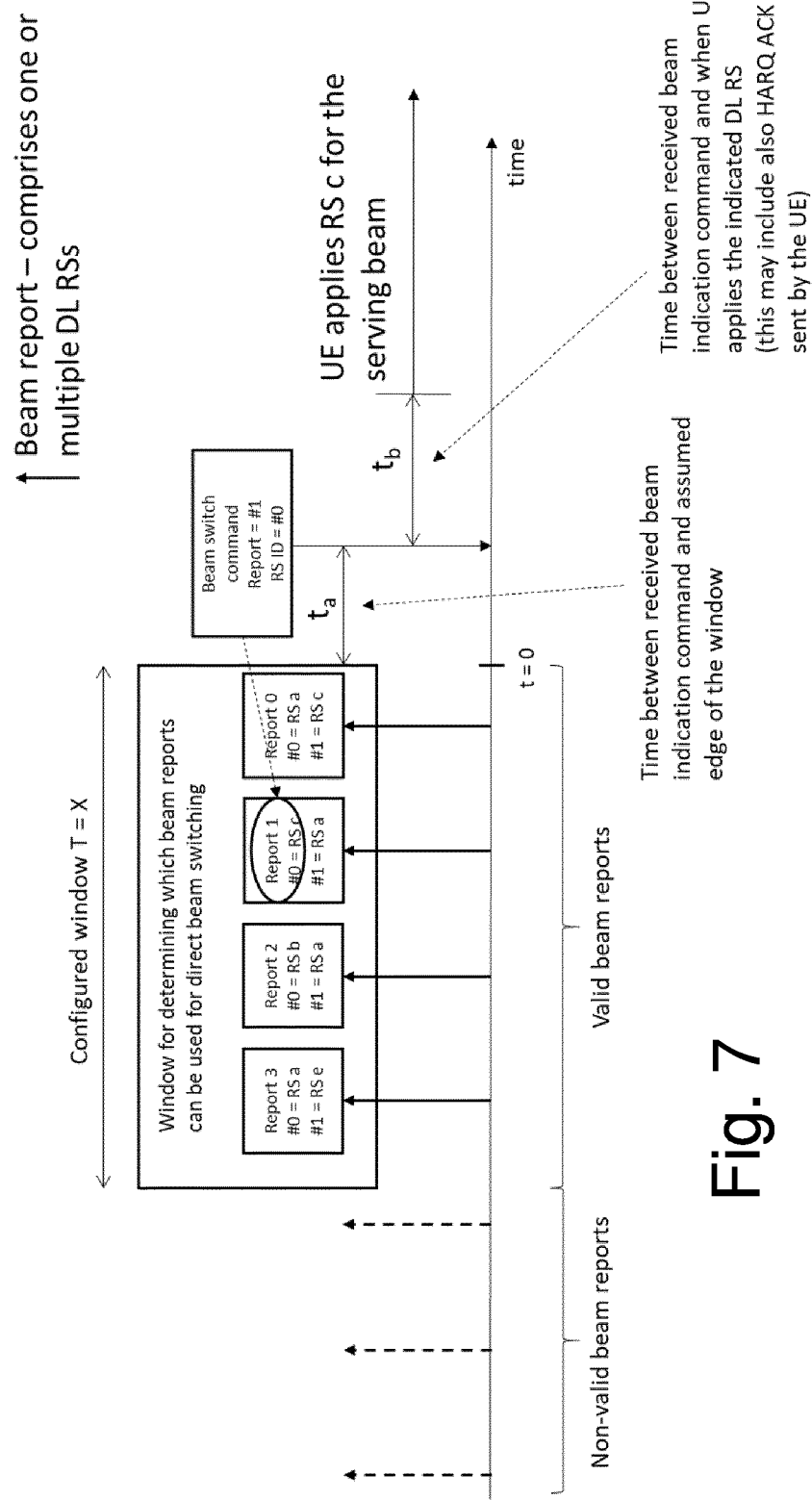
FIG. 7 shows a schematic representation of a measurement report pool operated according to a first in first out queue or sliding window in relation to a beam switch command.

FIG. 7 shows a schematic representation of a measurement report pool operated according to a FIFO queue or sliding window in relation to a beam switch command. The beam switch command may indicate the index #1 of a measurement report within the measurement pool and the index #0 of a DL-RS within the measurement report to the UE. The UE may determine the serving beam based on the DL-RS with the index #0 within the measurement with the index #1.

The beam switch command and the front edge of the sliding window are distant in time by a time period $t_a$. The beam switch command and the start of the use of the serving beam are distant in time by a time period $t_b$.

Figure 8:
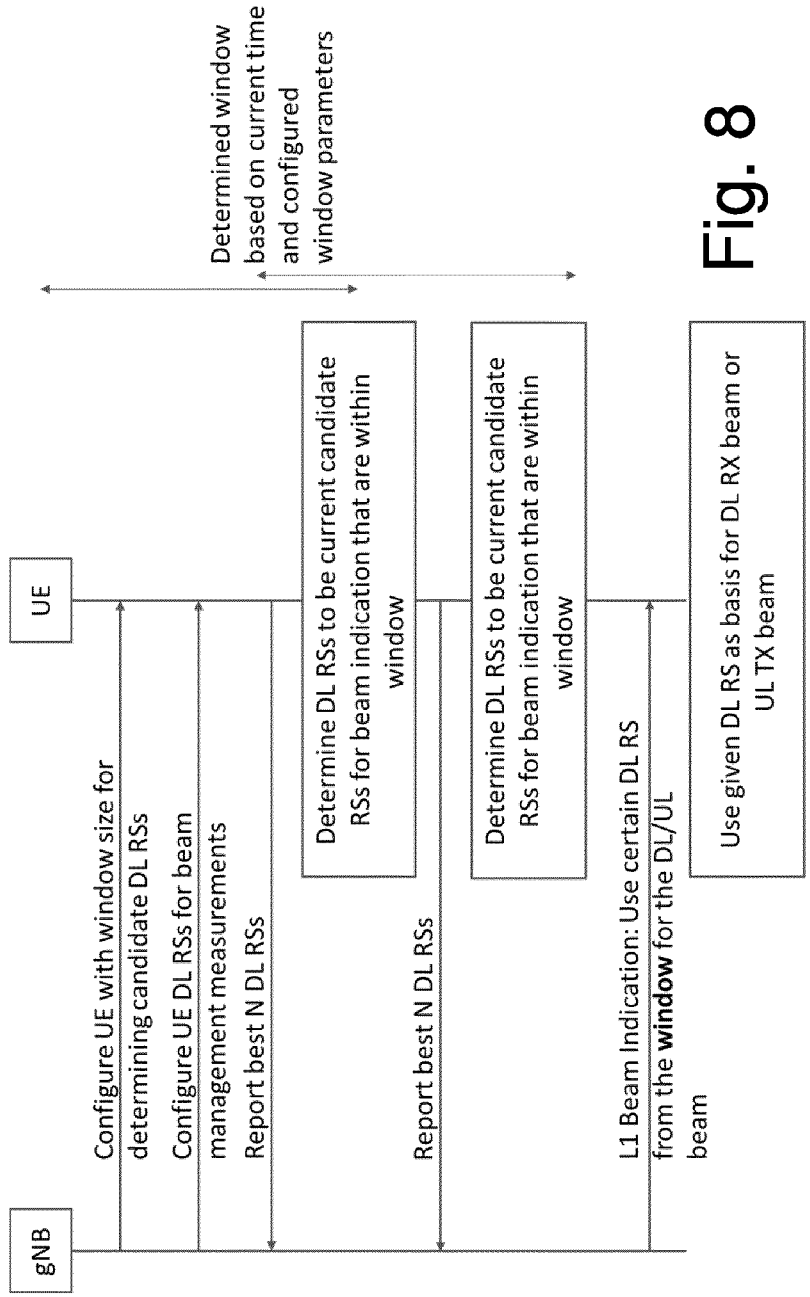
FIG. 8 shows a schematic representation of a signalling diagram of a process performed by a user equipment and a gNodeB for allowing the user equipment to determine a serving beam based on a selected downlink reference signal within a selected measurement report.

FIG. 8 shows a schematic representation of a signalling diagram of a process performed by a UE and a gNB for allowing the UE to determine a serving beam based on a selected DL-RS within a selected measurement report.

The gNB may configure the UE with a measurement report pool configuration. The gNB may provide an indication that the measurement report pool operates according to a FIFO queue or sliding window. The gNB may indicate a FIFO queue or sliding window parameter (e.g. size or number of measurement reports).

The UE may determine and maintain a measurement report pool according to the FIFO queue or sliding window parameter. For example the size of the FIFO queue or sliding window is four and therefore the measurement report pool comprises four measurement reports. Likewise, the gNB may determine and maintain a measurement report pool.

The gNB may configure the UE with candidate DL RSs. Each candidate DL RS may be associated with a beam pair link (i.e. DL TX beam and a DL RX beam).

The UE may measure the candidate DL RS and may provide a measurement report to the gNB indicating one or more strongest DL RSs.

The UE may update the measurement report pool. The UE may add the measurement report to the measurement report pool. The measurement report may be the newest measurement report within the measurement report pool. The UE may remove the oldest measurement report from the measurement report pool.

Likewise, the gNB may update the measurement report pool. The gNB may add the measurement report to the measurement report pool. The measurement report may be the newest measurement report within the measurement report pool. The gNB may remove the oldest measurement report from the measurement report pool.

The UE may repeat the previous operations.

At some point, the gNB may provide an indication to the UE indicating an index of a measurement report within the measurement report pool and an index of a DL-RS within the measurement report.

The indication may be a beam indication or beam switching command. The indication may be provided via DCI or layer 1

The UE may provide a HARQ ACK to the gNB indicating that the UE successfully received the indication.

The UE may identify a DL-RS based on the index of the measurement report within the measurement report pool and the index of a DL-RS within the measurement report.

The UE may determine a serving DL RX beam and/or UL TX beam based on the identified DL-RS.

The UE may use the serving DL RX beam for reception of DL signals and/or channels.

For DL signals and/or channels the UE may use the DL RX beam used to receive the DL RS to receive the DL signals and/or channels.

For UL signals and/or channels the UE may use the DL RX beam used to receive the DL RS as UL TX beam to transmit the UL signals and/or channels.

The UE may use the serving DL RX beam and/or UL TX beam after an activation latency or switching latency time. The UE may use the serving DL RX beam and/or UL TX beam after a PDCCH decoding latency.

A similar process may be used to perform UL beam diversity transmission based on group based beam reporting.

The gNB may configure the UE with a beam group measurement report configuration to the UE. The beam group measurement report configuration may comprise a transmit power indication (e.g. nominal or over an interval), which the UE may use to group DL RSs. DL RSs grouping may be used in addition to or separately from a spatial filter utilization at the UE.

The gNB may configure the UE with a measurement report pool configuration. The gNB may provide an indication that the measurement report pool operates according to a FIFO queue or sliding window. The gNB may indicate a FIFO queue or sliding window parameter (e.g. size or number of measurement reports).

The gNB may configure the UE candidate DL RSs. Each candidate DL RS may be associated with a DL TX beam and a DL RX beam. Each candidate DL RS may include a TRP ID. The candidate DL RSs may be grouped based on their TRP IDs. A UL diversity reporting ID may be associated to existing CSI-ResourceConfig (csi-RS-ResourceSetList that may include SSB/CSI-RS).

The UE may measure the candidate DL RSs and may determine which candidate DL-RSs may be grouped to generate UL TX beams and UL RX beams for UL beam diversity transmission.

A single TX panel capable UE may prioritize two or more DL-RSs that belong to different TRPs and that are received simultaneously, for example for spatial domain multiplexing (SDM). The UE may prioritize two or more DL-RSs based on which the UE can transmit using the single TX panel.

The UE may takes into account possible maximum power reduction (MPR) and/or duty cycle restriction regarding the DL RX beam. The UE may select DL-RSs so that UL transmission capability (e.g. achievable effective isotropic radiated power) is feasible when using the DL-RX beam used to measure DL-RSs.

The UE may provide a measurement report to the gNB. The measurement report may comprise a group of DL-RSs. The UE may provide an indication to the gNB indicating a power level used for the group of DL-RSs.

The UE may update the measurement report pool. The UE may add the measurement report to the measurement report pool. The measurement report may be the newest measurement report within the measurement report pool. The UE may remove the oldest measurement report from the measurement report pool.

Likewise, the gNB may update the measurement report pool. The gNB may add the measurement report to the measurement report pool. The measurement report may be the newest measurement report within the measurement report pool. The gNB may remove the oldest measurement report from the measurement report pool and so on.

The UE may repeat the previous operations.

Subsequently, the UE may receive a scheduling indication for an UL transmission (e.g. PUCCH or PUSCH). The scheduling indication may comprise an index of a measurement report within the measurement report pool and an index of a group of DL-RS within the measurement report.

The UE may determine serving UL TX beams based on the group of DL-RSs. The UE may use the DL RX beams used to receive simultaneously reference RSs as UL TX beams. The UE may use the DL RX beams used to receive simultaneously reference RSs as UL TX beams.

The UE may use the serving UL TX beams for transmission of UL signals and/or channels.

The UE may use the serving UL TX beams after an activation latency or switching latency time. The UE may use the serving UL TX beams after a PDCCH decoding latency.

As explained above each measurement report within the measurement report pool is indexed. The index of the measurement report belongs to a measurement report index space.

The measurement report index space may be specific for measurement reports with a specific reporting periodicity type or may be common for all measurement reports regardless their reporting periodicity types. The reporting periodicity type may comprise aperiodic, semi-persistent or periodic.

For example, each time the UE transmits a measurement report of any reporting periodicity type an index value within the measurement report index space is increased. Alternatively, each time the UE transmits a measurement report of a specific reporting periodicity type an index value within the measurement report index space is increased.

Specific measurement report index spaces may have different configurations. For example, the specific measurement report index spaces for periodic measurement report may comprise four indexes. The specific measurement report index spaces for periodic measurement report may comprise two indexes.

A measurement report index space may be specific for measurement reports with a specific UL resource used for reporting (e.g. PUCCH, PUSCH, MAC CE, beam group reporting, reports with panel IDs).

A measurement report index space or the use of an index may be specific for measurement reports with a specific per reporting setting. For specific PUCCH reporting settings the indexing may be used but for others PUCCH reporting settings the indexing may not be used.

A measurement report index space or the use of an index may be specific for measurement reports with a specific reporting quantity (e.g. SSB-reference signal received power, CSI-RS-RSRP reference signal received power).

An index may be an explicit value that the UE may generate for each measurement report and signals it as part of a report. The use of explicit value may be configurable per reporting configuration type (aperiodic, Semi persistent, periodic). When configured the UE may use specific reporting format that can accommodate beam reporting and the explicit value.

The index of a measurement report may be counted each time the UE may provide a measurement report to the gNB. The count may be restarted within a specific number of time (e.g. specific number of radio frames or slots).

Figure 9:
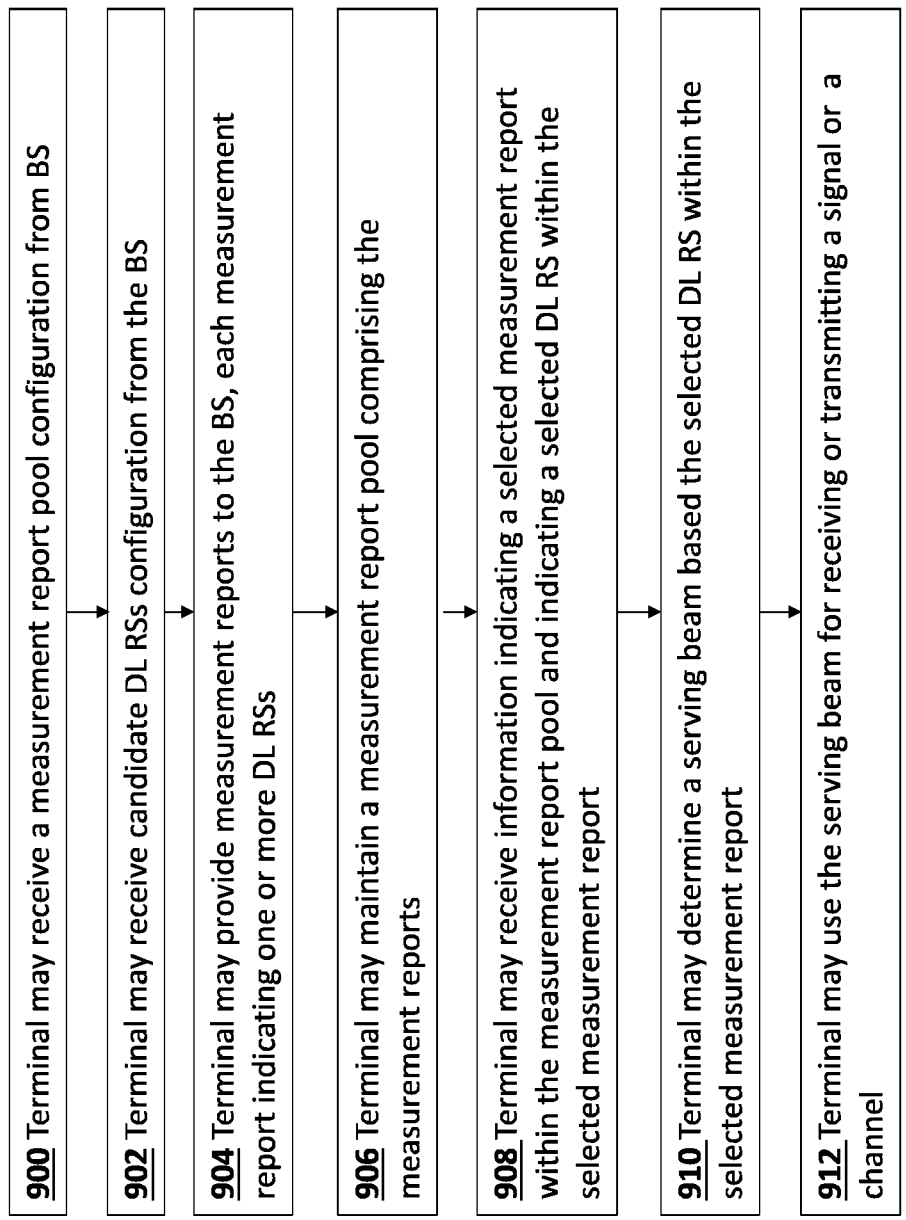
FIG. 9 shows a schematic representation of a block diagram of a method performed by a terminal for allowing the terminal to determine a serving beam based on a selected downlink reference signal within a selected measurement report.

FIG. 9 shows a schematic representation of a block diagram of a method performed by a terminal for allowing the terminal to determine a serving beam based on a selected measurement report within a selected measurement report.

In step 900, a terminal (e.g. UE) may receive a measurement report pool configuration from a BS (gNB). The measurement report pool configuration may comprise an indication that the measurement report pool operates according to a FIFO queue or sliding window. The measurement report pool configuration may comprise a FIFO queue or sliding window parameter (e.g. size or fixed number of measurement reports).

In step 902, the terminal may receive candidate DL RSs configuration from the BS. The candidate DL RSs configuration may indicate the candidate DL RSs to the UE. Each candidate DL RS may be associated with a DL TX beam and a DL RX beam.

In step 904, the terminal may provide measurement reports to the BS. Each measurement report indicates one or more DL RSs. Each measurement report may indicate one or more DL RSs. Each measurement report may indicate one or more strongest DL RSs. Each measurement report may indicate two or more DL RSs received simultaneously.

Each measurement report may be indexed by an index of a first index space. Each DL RS may be indexed by an index of a second index space.

The first index space may be common to measurement reports with any reporting periodicity type, measurement reports with any reporting resources, measurement reports with any reporting settings and/or measurement reports with any reported quantity.

The first index space may be specific to measurement reports with a specific reporting configuration type, measurement reports with a specific reporting resource, measurement reports with a specific reporting setting and/or measurement reports with a specific report quantity.

The reporting periodicity type may comprise aperiodic, semi-persistent report or periodic.

The index of a measurement report may be determined by the BS and received from the BS in a request to provide a measurement report. Alternatively, the index of a measurement report may be determined by the terminal.

In step 906, the terminal may maintain a measurement report pool comprising the measurement reports.

In step 908, the terminal may receive information indicating a selected measurement report within the measurement report pool and indicating a selected DL RS within the selected measurement report. The information may comprise the index of the selected measurement report and the index of the selected DL RS.

In step 910, the terminal may determine a serving beam based the selected DL RS within the selected measurement report.

The terminal may determine a DL RX beam associated with the selected DL RS. The terminal may determine the serving beam based on the DL RX beam associated with the selected DL RS.

In step 912, the terminal may use the serving beam for receiving or transmitting a signal or a channel.

The serving beam may be serving a serving DL beam and the terminal may use the serving DL RX beam to receive one or more DL signals or channels. The serving beam may be a serving UL TX beam and the terminal may use the serving UL TX beam to transmit one or more UL signals or channels.

The terminal may receive an indication of the one or more UL signals or channels and/or the one or more DL signals or channels from the BS.

Figure 10:
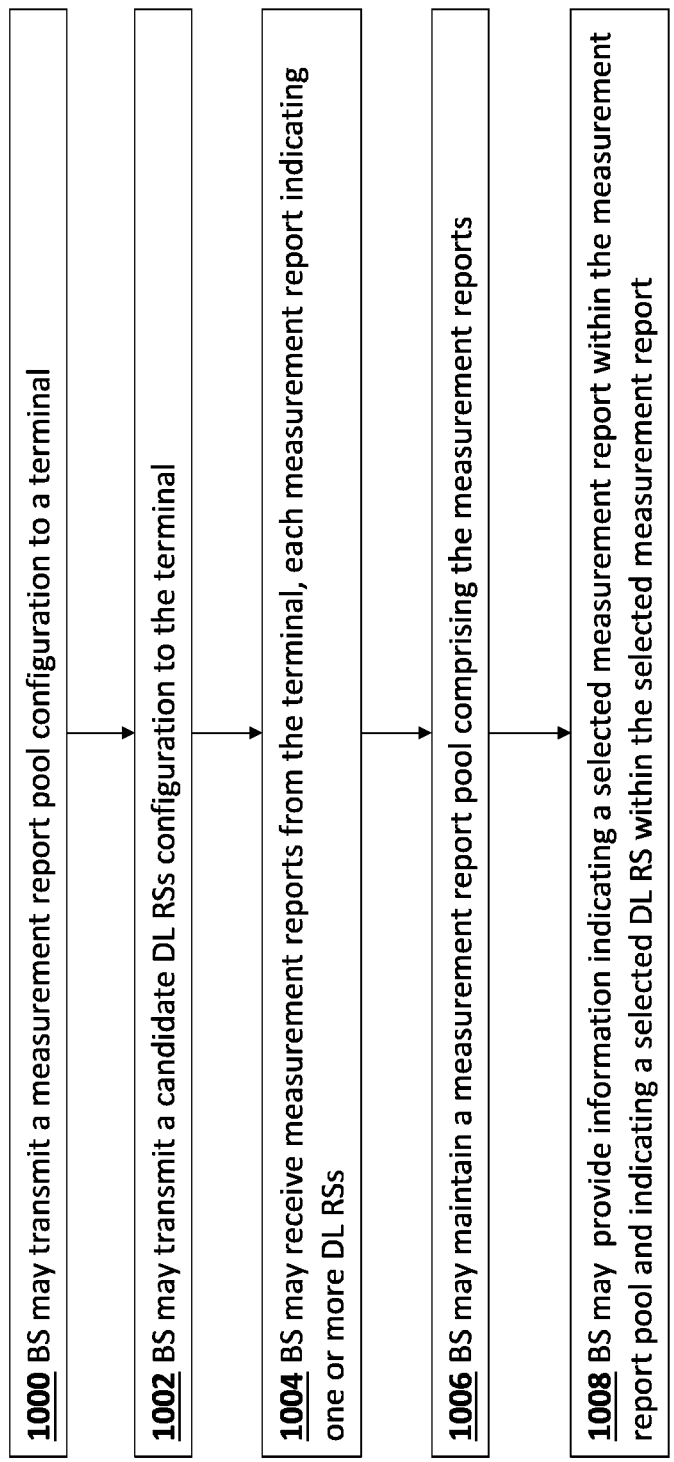
FIG. 10 shows a schematic representation of a block diagram of a method performed by a base station for allowing a terminal to determine a serving beam based on a downlink reference signal within a selected measurement report.

The terminal may use the serving DL RX beam and/or the UL TX beam for a duration determined based on a serving DL RX beam and/or the UL TX beam switching latency or activation latency of the terminal. FIG. 10 shows a schematic representation of a block diagram of a method performed by a BS for allowing a terminal to determine a serving beam based on a selected measurement report within a selected measurement report.

In step 1000, a BS (e.g. gNB) may transmit a measurement report pool configuration to a terminal. The measurement report pool configuration may comprise an indication that the measurement report pool operates according to a FIFO queue or sliding window. The measurement report pool configuration may comprise a FIFO queue or sliding window parameter (e.g. size or fixed number of measurement reports).

In step 1002, the BS may transmit a candidate DL RSs configuration to the terminal. The candidate DL RSs configuration may indicate the candidate DL RSs to the UE. Each candidate DL RS may be associated with a DL TX beam and a DL RX beam.

In step 1004, the BS may receive measurement reports from the terminal. Each measurement report indicates one or more DL RSs. Each measurement report may indicate one or more DL RSs. Each measurement report may indicate one or more strongest DL RSs. Each measurement report may indicate two or more DL RSs received simultaneously.

Each measurement report may be indexed by an index of a first index space. Each DL RS may be indexed by an index of a second index space.

The first index space may be common to measurement reports with any reporting periodicity type, measurement reports with any reporting resources, measurement reports with any reporting settings and/or measurement reports with any reported quantity.

The first index space may be specific to measurement reports with a specific reporting configuration type, measurement reports with a specific reporting resource, measurement reports with a specific reporting setting and/or measurement reports with a specific report quantity.

The reporting periodicity type may comprise aperiodic, semi-persistent report or periodic.

The index of a measurement report may be determined by the BS and received provided to the terminal in a request to provide a measurement report. Alternatively, the index of a measurement report may be determined by the terminal.

In step 1006, the BS may maintain a measurement report pool comprising the measurement reports.

In step 1008, the BS may provide information indicating a selected measurement report within the measurement report pool and indicating a selected DL RS within the selected measurement report. The information may comprise the index of the selected measurement report and the index of the selected DL RS.

FIG. 11 shows a schematic representation of non-volatile memory media 1100*a* (e.g. computer disc (CD) or digital versatile disc (DVD)) and 1100*b* (e.g. universal serial bus (USB) memory stick) storing instructions and/or parameters 1102 which when executed by a processor allow the processor to perform one or more of the steps of the methods of FIG. 9 or 10.

It is noted that while the above describes example embodiments, there are several variations and modifications which may be made to the disclosed solution without departing from the scope of the present invention.

It will be understood that although the above concepts have been discussed in the context of a 5GS, one or more of these concepts may be applied to other cellular systems.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIG. 9 or 10, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
 (a) hardware-only circuit implementations (such as implementations in only analogue and/or digital circuitry);
 (b) combinations of hardware circuits and software, such as:
  (i) a combination of analogue and/or digital hardware circuit(s) with software/firmware and
  (ii) any portions of hardware processor(s) with software (including digital signal processor(s)), software, and memory(ies) that work together to cause an apparatus, such as the communications device or base station to perform the various functions previously described; and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

What is claimed is:

1. An apparatus comprising:
at least one processor; and
at least one non-transitory memory storing instructions that, when executed with the at least one processor, cause the apparatus at least to:
maintain a measurement report pool operated according to a first in first out queue or a sliding window, the measurement report pool comprising a plurality of measurement reports provided to a base station, wherein each of the plurality of measurement reports indicate at least one group of two or more downlink reference signals received simultaneously, wherein each of the plurality of measurement reports is associated with a first index from a first index space, and wherein each downlink reference signal within the at least one group of two or more downlink reference signals is associated with a second index from a second index space, wherein the first index space is specific to one or more measurement reports with a specific reporting configuration type, one or more measurement reports with a specific reporting resource, one or more measurement reports with a specific reporting setting, and one or more measurement reports with a specific report quantity, and wherein the second index space is specific to downlink reference signals that are grouped by transmission reception point (TRP) identifiers;
receive, from the base station via a Downlink Control Information (DCI) format, information comprising the first index corresponding to a selected measurement report within the measurement report pool and the second index corresponding to a selected group of two or more downlink reference signals within the selected measurement report from the base station, wherein the selected group of two or more downlink reference signals comprises non-zero-power channel state information reference signals (NZP-CSI-RSs) received simultaneously within a single beam group;
determine a set of serving uplink transmit beams by reusing downlink receive beams employed to receive non-zero-power channel state information reference signals (NZP-CSI-RSs) of the selected group of two or more downlink reference signals within the selected measurement report;
employ each beam in the set of serving uplink transmit beams for uplink control information (UCI) transmitted on a Physical Uplink Control Channel (PUCCH) and further reuse a same serving uplink transmit beams for data transmitted on a Physical Uplink Shared Channel (PUSCH), a duration of use being determined based on a serving uplink transmit beam switching latency or activation latency of the apparatus; and
transmit, via the set of serving uplink transmit beams, one or more uplink signals to the base station as part of an uplink beam diversity transmission.

2. The apparatus of claim 1, wherein the instructions, when executed with the at least one processor, further cause the apparatus at least to:
receive an indication of the one or more uplink signals from the base station.

3. The apparatus of claim 1, wherein the measurement report pool comprises a fixed number of measurement reports.

4. The apparatus of claim 1, wherein the reporting periodicity type comprises an aperiodic report, a semi-persistent report, or a periodic report.

5. The apparatus of claim 4, wherein the selected measurement report indicates one or more strongest downlink reference signals from the at least one group of two or more downlink reference signals.

* * * * *